United States Patent [19]

Vinal

[11] Patent Number: 4,647,992
[45] Date of Patent: Mar. 3, 1987

[54] COMBINED MAGNETIC CHANNEL SIGNAL SENSOR AND SERVO CONTROL TRACK FOLLOWING SYSTEM AND METHOD

[75] Inventor: Albert W. Vinal, Cary, N.C.

[73] Assignee: International Business Machines Corporation, Armonk, N.Y.

[21] Appl. No.: 675,090

[22] Filed: Nov. 26, 1984

[51] Int. Cl.$^4$ .................. G11B 21/10; G11B 5/39
[52] U.S. Cl. ................................ 360/77; 360/113; 318/653
[58] Field of Search ........................ 360/75–78, 360/113, 110, 112, 111; 318/561, 647, 653; 357/27

[56] References Cited

U.S. PATENT DOCUMENTS

| | | | |
|---|---|---|---|
| 3,246,307 | 4/1966 | Stanley | 360/77 |
| 3,534,344 | 10/1970 | Santana | 360/77 |
| 3,918,091 | 11/1975 | Walraven et al. | 360/77 |
| 4,055,849 | 10/1977 | Hickok | 360/77 |
| 4,164,781 | 8/1979 | Brown | 360/77 |

FOREIGN PATENT DOCUMENTS

58-98826  6/1983  Japan .................. 360/113

OTHER PUBLICATIONS

IBL TDB, vol. 19, No. 8, "Data-Track-Following Servo System" Martin, 1/77, pp. 3228–3229.
IBM TDB, vol. 19, No. 9, "AGC System for Dual-Element Magnetic Head Servo System" Gronata et al., 2/77, pp. 3575–3576.

Primary Examiner—Raymond F. Cardillo
Assistant Examiner—Steven R. Garland
Attorney, Agent, or Firm—Edward H. Duffield

[57] ABSTRACT

Servoing is accomplished utilizing the same read head and the same data track by utilizing a differentially sensitive magnetic sensor. The sensor is utilized as the data read back head sensitive element but separate outputs from the differential sensor are supplied to separate track following amplifiers isolated from the data signal amplifier. The separate amplifiers for the servo information utilize the inherent differential sensitivity of the sensor. As one-half or the other of the differentially sensitive sensor drifts over the edge of a recorded data track, its signal output level will follow. This differential between the left and right halves of the sensor in the form of a change in signal level at the output can be amplified, referenced to common ground for high common mode noise rejection, and a differential signal derived from the difference between the left and right halves of the sensor. The differential is proportional to the distance off track that the sensor has wandered provided that at least a portion of the sensor remains over the track. A servoing system utilizing the differential output between the left and right and driven by the magnitude of the difference between left and right half signal components is utilized to force the head positioning system back in the appropriate direction to center the head over the data channel.

2 Claims, 5 Drawing Figures

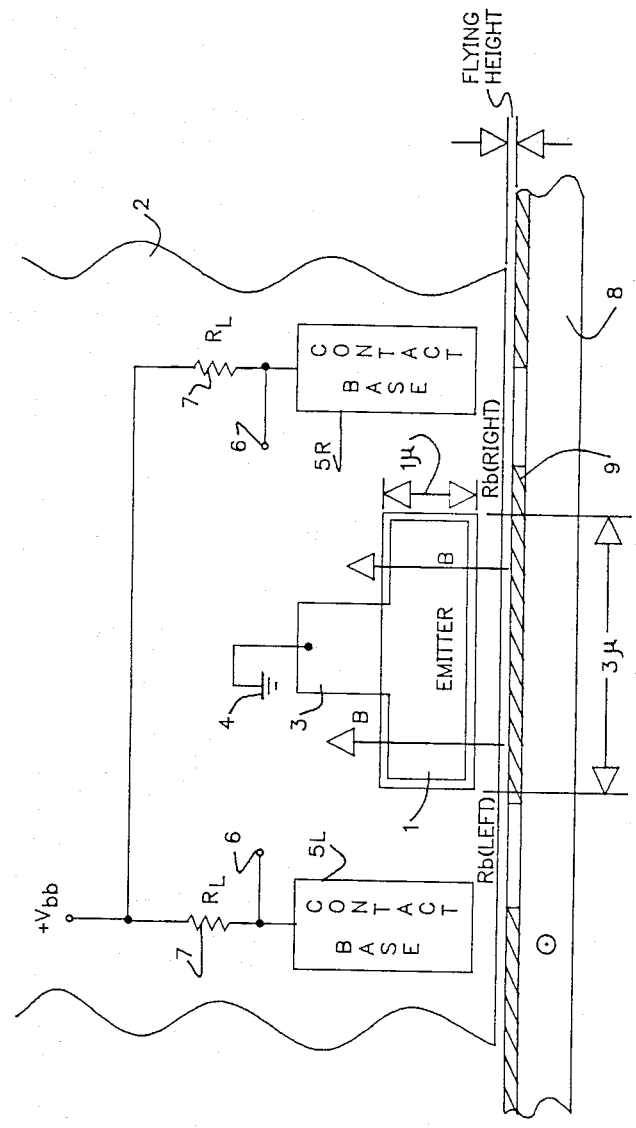

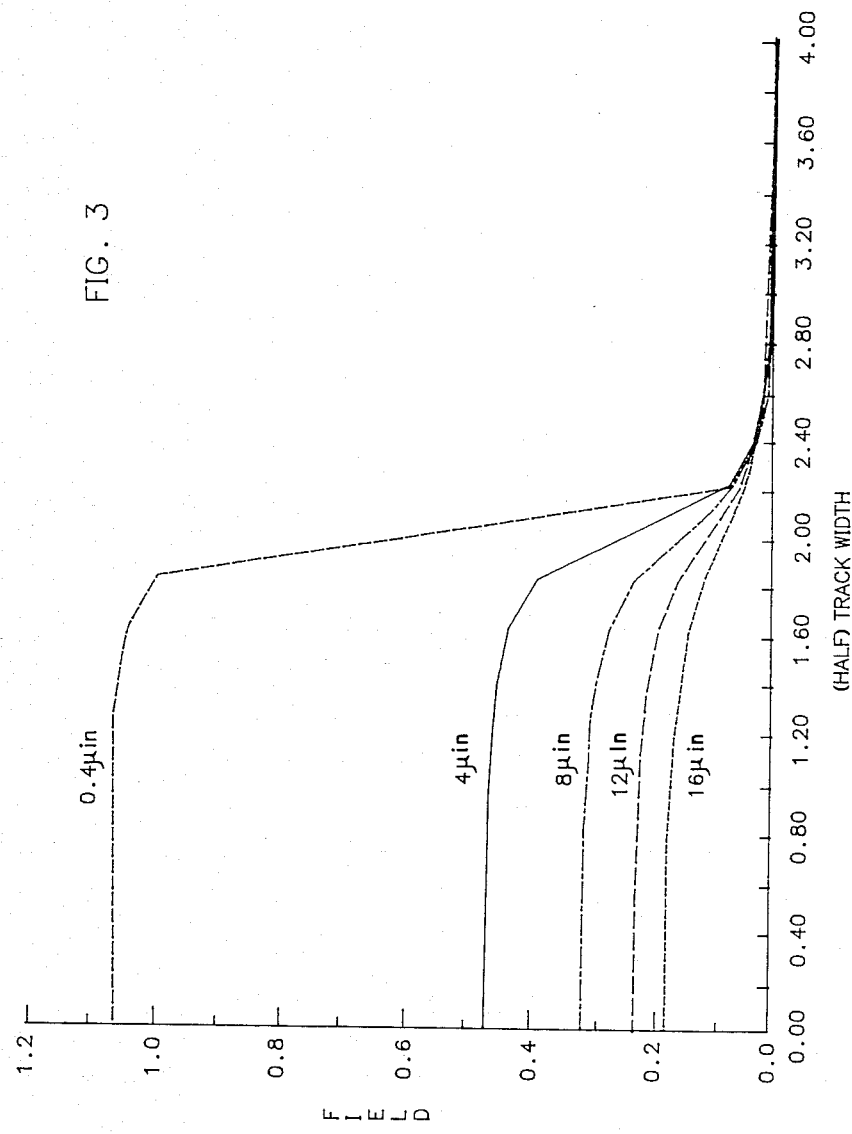

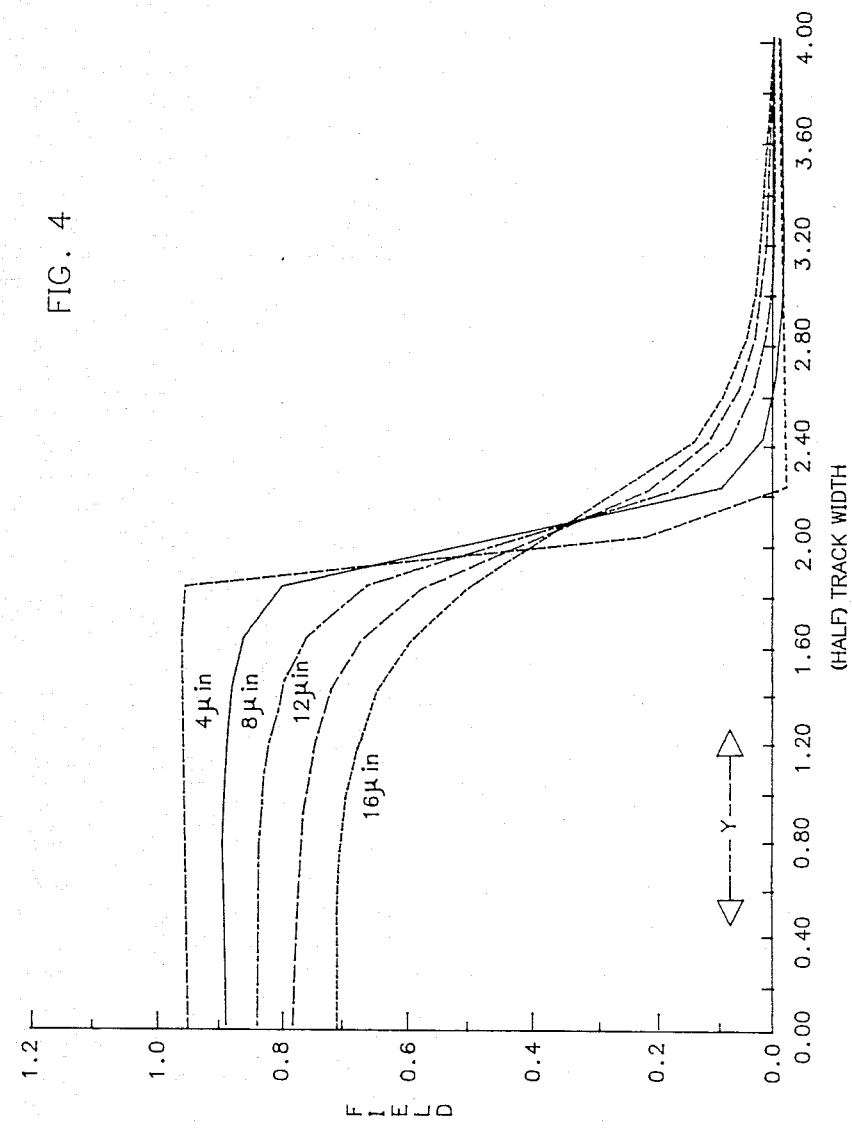

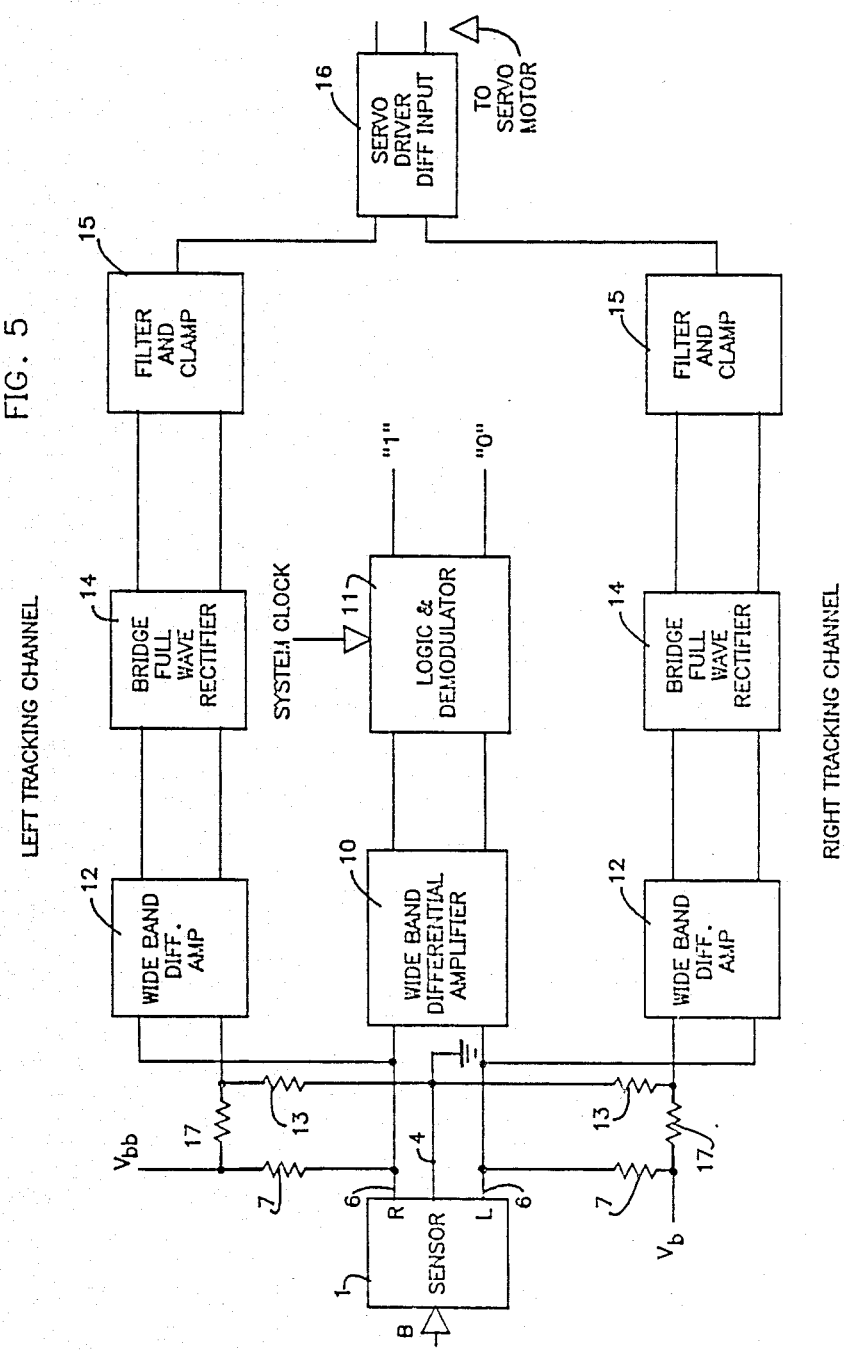

COMBINED MAGNETIC CHANNEL SIGNAL SENSOR AND SERVO CONTROL TRACK FOLLOWING SYSTEM AND METHOD

FIELD OF THE INVENTION

This invention relates to magnetic recording track following or servo control techniques in general and specifically to data or signal track and servo combined signal sensing in particular.

PRIOR ART

Numerous prior art data track servoing systems exist for the magnetic recording field for both data or analog signal track systems. Typically, a servo track is recorded on a moving disk, drum or tape to aid in track finding and following with a signal read back head. An increasing need to enhance the data density on direct access storage devices and tape systems in particular will ultimately require data tracks to be only a few microns wide and to be recorded at 20,000 or more bits per lineal inch. Extremely precise servoing systems will be required to achieve accurate read back of such information. In addition, due to the track size and bit density, it may be shown that inductive read back heads will have to be replaced by active magnetic solid state field sensors in order to retain a suitable signal to noise ratio. These requirements have not been met in state of the art inductive read head systems referred to previously. In addition, the provision of a separate servo following track with a separate servo read head adds elements of potential failure and increased cost to the overall track access and following system. Furthermore, the use of separate recorded servo tracks often requires a separate machine at the place of manufacture of the record medium in the form of a servo track writer. Tolerances for the position of writing the track must take into account that the end user will have read back heads that may differ somewhat from those at the point of manufacture where the servo track was written. Consequently, additional tolerances in spacing of data tracks or servo tracks may be necessary that will further reduce the achievable track density on the recording medium.

OBJECTS OF THE INVENTION

In view of the foregoing known deficiencies in the prior art, it is an object of this invention to provide an improved data read back and self-centering servo control signal sensor system and apparatus.

Yet another object of the present invention is to provide an improved servo control technique in which the data or signal channel itself may be sensed to derive the servo control information directly.

SUMMARY

The foregoing and still other objects of the invention which have not been specifically enumerated are met in the present system by utilizing a new magnetic sensor technology. The new magnetic sensors may be those described in my own co-pending commonly assigned patent application Ser. No. 388,773, abandoned, Ser. No. 499,100 abandoned, and Ser. No. 499,101, abandoned, for example. In these magnetic sensor patent applications, differential output solid state magnetic sensors are shown that can be applied to the problem of following a single track of data. Utilizing such a magnetic sensor with its own inherent differential signal output, one can construct servo track following signals directly from the data track while actually reading data simultaneously. As described in my aforementioned applications, if a magnetic field is applied to one-half of the sensitive emitter area but not to the other, the side energized will respond by an increase or decrease of injection of minority carriers depending on the direction of the magnetic field experienced on that half of the sensor.

This property of the sensor is essential in the center track data and combined servo system herein. The output of the differential magnetic sensor is coupled directly to a wide band differential amplifier. The amplifier is used to detect recorded data and to output appropriately shaped square waves, for example, to a logic demodulation unit that is strobed in time by a synchronous clock pulse to extract binary 1s and 0s from the recorded data on a data channel, for example.

The individual left and right sides of the differential sensor are also directly coupled to separate individual left and right wide band differential amplifiers that form a part of the left and right servo tracking signal system respectively. The input to each of these latter differential amplifiers is referenced to an equivalent quiescent base potential. The separate outputs from each of the differential servo amplifiers are coupled to separate full wave bridge rectifiers, the output of which is independently directly coupled to differential input filters and ground clamping circuits. The outputs of the left and right servo clamping circuits are coupled to a final differential servo drive amplifier with a high common mode of rejection due to the parallel design of the separate servo signal channels.

When the sensor itself is physically in the center of a recorded track, the rectified and filtered outputs from the left and right servo signal channels that feed the differential servo drive amplifier are equal and the servo amplifier output will be essentially in a balanced mode. When the sensor physically tends to slide left or right of the center of the channel and the left or right half of the sensor experiences a reduced magnetic field, the input to the differential servo amplifier serving that half of the sensor will become unbalanced and cause a consequent unbalance in the servo drive amplifier which can be coupled to a servo drive motor to drive the sensor head assembly in the appropriate direction to again achieve a center track or null signal.

BRIEF DESCRIPTION OF THE DRAWINGS

The invention will be described with reference to a preferred embodiment as illustrated in a drawing comprising the figures as follows:

FIG. 2 illustrates a horizontal elevation through a magnetic recording medium having a recorded data track and having a sensor such as that depicted in FIG. 1 positioned over the data track for sensing magnetic fields emanating therefrom.

FIG. 3 is a plot of track width on the horizontal and height above the recorded track on the vertical showing how the field intensity from a recorded track falls off as one nears the edge of a four micron wide hypothetical data track. The track is recorded in the horizontal mode of recording.

FIG. 4 illustrates a plot like that of FIG. 3 but for vertical recording.

FIG. 5 is an electrical schematic drawing of the combined data sensor and servo control circuit and technique as employed in the present invention.

DETAILED SPECIFICATION

Figure 1:
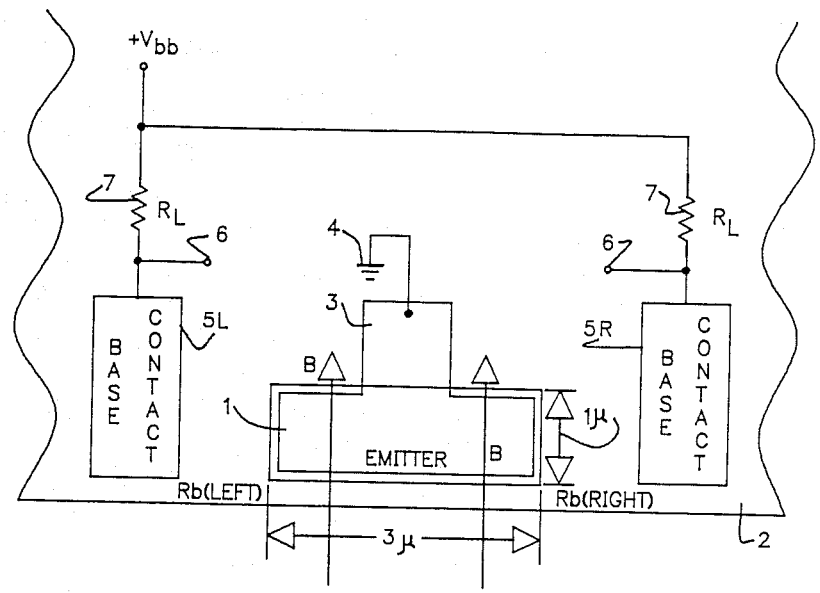
FIG. 1 illustrates a plan view of a differential magneto diode such as shown in my co-pending application Ser. No. 388,773, which may be used in the present invention as the combined data signal and servo signal sensor.

As alluded to above, the needs for increasing recorded data density are a source of continuing pressure on system designers which may be reflected in the press toward higher bit densities per lineal inch and high track densities per inch in data recording systems. The difficulty of accurate servo control for data read back heads in such environments increases dramatically as will be appreciated by those of skill in the art. In addition, the higher track and bit densities restrict the applicability of inductive sensing heads as noted earlier. The new magnetic sensor technology currently being developed as described in my previously mentioned co-pending patent applications affords an opportunity for solving both high density data sensing and servo control systems simultaneously for magnetic recording and read back systems.

The sensors described in my aforementined applications have a sensitive area of a few square microns, provide linear signal outputs and are differential with respect to the polarity of the magnetic field which they sense. They are also differential with respect to their symmetry, i.e., the left half of the sensor produces a signal differential to that of the right half and vice versa. The use of such magnetic sensors or other differential magnetic sensors to function simultaneously as both a channel data information sensor and a center track servo control detection means are the new attributes of the present invention. There is no need for a special servo data record or track utilizing this concept and method since the servo control is accomplished using the data channel signal output as sensed by a sensor of the type described. The use of a single magnetic sensor to achieve both functions of data read back and servo control signal sensing greatly alleviates the problems associated with variations in flying height above the record medium, reduces the cost and complexity of the device and eliminates the need for separate servo track writing and reading and allows for high track density track following.

There are a variety of magnetic sensors under development that possess the properties necessary for functioning in this system. Two classes of the sensors being developed are the magnetic transistors and magneto diodes. Both of these technologies have numerous representatives in the technology as well as those represented by my aforementioned applications. Any of these devices that provides a differential output is applicable to the present invention.

The simplest embodiment of the presently contemplated invention would utilize a differential magneto diode as shown in FIG. 1. This diode, as described in my aforementioned co-pending patent application Ser. No. 388,773 is used as an example. This diode consists of an emitter 1 as shown in FIG. 1, which is formed of an N+ diffusion of a rectangular shape or a zinc deposition into a P-type silicon substrate 2. The emitter 1, which is the N+ diffusion or zinc deposition, is covered with an aluminum contact 3 to which electrical connection can be made as shown by the grounded connection 4. Two separate base contacts 5L and 5R representing the left and right base contacts, respectively, are also shown. These may be aluminum deposited in ohmic contact to the surface of the P-type silicon substrate 2. Output leads 6 and output load resistances 7 are supplied with a base voltage $V_{bb}$ as illustrated.

Application of a magnetic field B parallel to the lower surface of the diode emitter 1 in FIG. 1 causes an unequal minority carrier injection to occur along the bottom surface of the emitter, i.e., into the substrate as depicted in FIG. 1. These carriers will be conducted preferentially toward the left or right base contact, whichever is closer to their point from injection of the emitter. The unequal minority carrier injection in left and right halves of the surface of the emitter 1 will modulate the effective base to emitter resistance between the emitter and the left base 5L or the emitter and the right base 5R, as described in my previously mentioned co-pending applications. In this manner, the base to emitter resistance will increase on one side of the emitter and decrease on the opposite side. The side on which the resistance increases or decreases depends upon the direction of the magnetic field. If the magnetic field is applied to one-half of the emitter but not to the other, the side receiving the magnetic field will respond by an increase or a decrease of injection depending upon the direction of the field. This property of the sensor, or sensors of its type, is useful in the center track servo following function described in this invention.

The orientation of a magneto diode sensor as shown in FIG. 1 with respect to a recorded data channel and a magnetic substrate 8 having a recorded track 9 is shown in FIG. 2. As will be understood by those of skill in the art, the data track may be recorded vertically or laterally as is shown as a recorded track 9 in the surface of the magnetic substrate 8. Of course, the data demodulation from the signal will differ depending upon which recording scheme is used.

Computer channel modeling has been used to identify the nature of the magnetic field obtainable in the vicinity of a four micron wide track recorded at an approximate density of 20,000 bits per inch. For the servo control function, it is necessary to determine the nature of the off-track signal or the field decay as one approaches the edge of a recorded track. FIGS. 3 and 4 illustrate this computed effect for both longitudinal and vertical recordings, respectively. The charts show the signal or field level experienced by a sensor as a function of flying height and as a function of the off-center distance of a point sensor moving at a given flying height. As is evident from these figures, the off-track signal response decays rapidly beyond the edge of any recorded track. This property of the off-track signal is utilized for developing a center track servo control system. The sensor may drift beyond the edge of the track without interfering with the actual signal developed from the other half of the sensor since one half will still lie within the central region of the recorded track. This fact, combined with the differential nature of the sensors of the sort described, provide a basis for a self-centering track servo control system.

A self-centering track servo control and data sensing system combination is shown in FIG. 5 as a preferred embodiment of the invention. In FIG. 5 the sensor 1 is shown simply as a block and its output leads 4 and 6 from the left and right halves of the sensor 1 are also shown with the same numbers as used in FIGS. 1 and 2. The load resistances RL are separately connected to the base voltage $V_{bb}$ as in FIGS. 1 and 2. The independent differential outputs from the left and right base contacts in the sensor appear on the separate leads 6. These are fed directly to a wide band differential data amplifier 10 where the output signal is compared against ground potential to produce a squared signal output and, although not shown, to derive clocking. The outputs of the differential amplifier 10 are fed to the logic and demodulator circuit 11 together with the system clock derived from the data signal through a phase locked oscillator, not shown. The logic and demodulator circuitry extracts from the square wave information the logical significance of data 1 or 0 for a digital recording track in a manner well known to those of skill in the art.

The combined function of providing a servo signal output is met by separately connecting each of the output leads 6 to a resistive network connected to one side each of separate wide band differential amplifiers 12 as shown. These amplifiers are DC referenced to ground by resistances 13 and 17 as shown. The individual excursions from each of the output leads 6 is thus compared in its separate wide band differential amplifier 12 against a ground potential. Because of the common ground, common mode rejection of noise input is also quite high in this design. The outputs of the separate wide band differential amplifiers 12 are applied to full wave rectifier bridge circuits 14 as shown to produce unidirectional output waveform having a level dependent upon the signal level being developed on the output lead 6 from the sensor 1. A filtering circuit is used to smooth the result. The clamp circuitry is used to reference the present level received to ground. These filter and clamping circuits 15 thus provide a slowly drifting DC level output to the inputs of a servo differential driver amplifier 16. When the sensor 1 is approximately in the center of the data track, the left and right base contact outputs 6 will provide approximately equal signal levels and the output of the separate filter and clamp circuits 15 will be approximately equal DC levels. The input of equal DC levels to the servo differential driver amplifier 16 will produce a null output to a servo control motor to leave the slider or track sensing head, on which the sensor 1 rides, in its present position. As the recorded track wanders or as the read back head drifts mechanically in position, the left or right half of the sensor 1 as shown in FIG. 2 will ride over the edge of the recorded data track 9 and will reduce the amount of signal from that half of the emitter. This will result in a differential imbalance between the outputs of the filter and clamp circuits 15 and a consequent imbalance in the inputs to the servo driver amplifier 16. This can be used to generate a direct correctional drive to the servo motor to move the sensor in the appropriate direction.

The amplifier 10 as shown in FIG. 5 provides its output to the demodulator and logic circuit 11 that is strobed in time by phase lock synchronous clock pulse driven by the data output pulses for extracting binary 1 and 0 data recorded in a digital recorded channel for example. The phase locked oscillator is not shown since its details of implementation are apparent to those of skill in the art.

The equivalent quiescent diode base potential is developed by the load resistances 7, 17 and the output bias resistances 13 for each of the output channels 6. Each of the inputs to the wide band differential amplifiers 12 thus will carry both common mode noise which, in a differential amplifier as is well understood, will be cancelled. The outputs of the differential servo amplifier 12 are coupled directly to full wave bridge rectifiers 14 as previously described which have their outputs in turn directly coupled to differential input filters and ground referenced clamping circuits 15 as shown and described earlier. This direct feedback based upon the differential output as the sensor slides to the left or right of the data track is extremely effective in causing the servo motor to drive the head assembly in the appropriate direction to again achieve servo null position. A full servo drive potential situation occurs when either half of sensor 1 is beyond the edge of the track. When this occurs, the full data channel output signal is half of its nominal value but will occur on only one half of the sensor with the other half of the sensor presenting essentially a zero signal output level. The resultant differential is at its maximum when applied to the servo driver differential input of the amplifier 16 in FIG. 5 and the maximum drive to achieve a null signal is in effect.

As will be apparent to those of skill in the art, the servo control technique described together with the apparatus as shown can be used equally well to track narrow channel analog recordings since the output signal could be used directly without the logic and demodulator in such systems. Thus, enhanced tracking for audio recordings of the analog sort are also made possible by this invention.

APPLICABILITY OF THE INVENTION

It will be apparent to those of skill in the art that this invention finds great utility in the field of digital magnetic recordings or analog magnetic recordings where high density recording and read back systems are contemplated and where extremely accurate servo control of the position of the read back head or sensor is desired. Numerous applications of this type exist in a wide variety of technical fields as will be readily understood.

Having described my invention with reference to a preferred embodiment thereof, it will be obvious to those of skill in the art that numerous departures from the specific sensor employed, to the details of the circuitry utilized for signal sensing will be apparent without departing from the basic concept of the combined servo sensing and track data sensing scheme as proposed. Therefore, what is described in the following claims is given by way of general description and not of limitation, and what is desired to be protected by Letters Patent is:

I claim:

1. A combined magnetic signal sensing and servo signal sensing and control system, comprising:
   a differentially sensitive magnetic sensor having two polarity-differential outputs;
   first means connected to one of said polarity differential outputs of said sensor for obtaining the magnitude of the signal on said one output;
   second means connected to the other of said polarity differential outputs for obtaining the magnitude of the signal of said other output;
   means connected to receive said magnitudes and for comparing said magnitudes and, responsive to the difference therebetween, for deriving a servo correction drive control signal; and
   means connected to said two polarity-differential outputs of said sensor for according digital data bit significance to the outputs in accordance with the relative polarities thereof;
   said means for deriving said servo correction drive control signal comprises for each said differential polarity output of said sensor a separate differential amplifier referenced to ground potential, a full wave rectifier means connected to receive the output of said amplifier and a filtering and clamping circuit means; and a differential amplifier connected to receive the outputs of said filtering and clamping circuits for each said differential output of said sensor, said amplifier deriving a differential servo correction drive control signal.

2. A method of simultaneously sensing magnetically recorded data and for deriving a servo control signal therefrom comprising steps of:

sensing the magnetically recorded data with a differentially sensitive magnetic sensor providing at least two differential-polarity signal outputs;

independently comparing each of said differential-polarity outputs against a reference potential level;

generating independently two separate output signals relative to the difference between said reference level and each of said compared output; and comparing the separate outputs of said comparing steps against each other and;

deriving a servo correction drive signal proportional to the difference therebetween; and deriving the data outputs recorded on said medium from said two differential polarity signal outputs.

* * * * *